US008071043B2

(12) United States Patent
Como et al.

(10) Patent No.: US 8,071,043 B2

(45) Date of Patent: Dec. 6, 2011

(54) ELECTRODE CAP FOR ELECTRICAL DISCHARGE REACTOR

(75) Inventors: Kevin Como, Chichester, NH (US); Robert Sterndale, Madbury, NH (US); Keith Croto, Albany, NH (US); Giovanni Paradiso, Greenland, NH (US)

(73) Assignee: Powerspan Corp., Portsmouth, NH (US)

( * ) Notice: Subject to any disclaimer, the term of this patent is extended or adjusted under 35 U.S.C. 154(b) by 993 days.

(21) Appl. No.: 12/016,276

(22) Filed: Jan. 18, 2008

(65) Prior Publication Data

US 2009/0184620 A1 Jul. 23, 2009

(51) Int. Cl.
*B01J 19/08* (2006.01)
*B01J 19/12* (2006.01)
*H01J 9/00* (2006.01)
*H01J 1/88* (2006.01)
*H01J 19/42* (2006.01)
*H01K 1/18* (2006.01)

(52) U.S. Cl. ...................... 422/186.04; 445/29; 313/281

(58) Field of Classification Search ............. 422/186.04; 445/29; 313/237, 281
See application file for complete search history.

(56) References Cited

U.S. PATENT DOCUMENTS

| | | | | |
|---|---|---|---|---|
| 4,155,827 | A * | 5/1979 | Maurer et al. | 204/428 |
| 6,132,692 | A | 10/2000 | Alix et al. | |
| 2004/0129566 | A1 * | 7/2004 | Nakagawa | 204/424 |
| 2005/0034973 | A1 | 2/2005 | Kelley et al. | |
| 2006/0148300 | A1 * | 7/2006 | Huang et al. | 439/353 |
| 2007/0243760 | A1 * | 10/2007 | Fujita et al. | 439/585 |

* cited by examiner

*Primary Examiner* — Jill Warden
*Assistant Examiner* — Charles D Hammond
(74) *Attorney, Agent, or Firm* — Grossman Tucker Perreault & Pfleger PLLC

(57) ABSTRACT

An electrode cap having a horseshoe-shaped conductor clip that has an opening at a closed end for receiving an electrode, the conductor clip fitted over a tube crimp; a cylindrical base cap having an elongated bump at one end of the base cap parallel to the axis of the base cap; and a cylindrical top cap closed on one end, having an inside diameter larger than the outside diameter of the base cap; and a spring for pressing a plate against the base cap.

9 Claims, 3 Drawing Sheets

ELECTRODE CAP FOR ELECTRICAL DISCHARGE REACTOR

BACKGROUND

1. Field of the Invention

The invention is in the field of electrical discharge reactors.

2. Description of the Related Art

Electrical discharge reactors are used in ozone generators, UV disinfection devices, and pollution control devices. An example is described in U.S. Pat. No. 6,132,692, which is not admitted to being prior art by its mention in this Background section. Some of the different types of electrical discharges include glow, corona, and dielectric barrier discharge.

Some of the common parts of dielectric barrier discharge reactors include a high voltage electrode, which is usually a wire or thin rod. This is disposed inside a tube that is typically made of glass or fused quartz. The tube forms the dielectric barrier. The inside of the tube may be filled with a gas, air, or a vacuum.

Reactors are made by providing a plurality of tube and electrode assemblies physically and electrically connected to plates. In the past, the electrode assemblies were capped with a metal cap on one end and secured to the plate with an extension and a screw. The electrode wire sticks out the end of the cap, and can be secured by welding.

This configuration has several disadvantages. First, centering the electrode assembly is not assured, and misalignment is possible. It is also difficult to secure the screws if there are many electrode assemblies close together. The electrode must make a sharp bend, which may damage it. Furthermore, the sharp end of the wire and corners of the cap might generate corona, which must be avoided. The tube seal is also susceptible to damage from vibration and rough handling. Finally, the old configuration does not allow for thermal expansion. These disadvantages tend to cause breakage and failure of the electrode.

What is needed, therefore, is an electrode cap for an electrical discharge reactor that is easy to install, assures proper alignment, inhibits corona, provides some cushion to avoid damages, and permits thermal expansion.

SUMMARY

The invention is an apparatus that satisfies the need for an electrode cap for an electrical discharge reactor that is easy to install, assures proper alignment, inhibits corona, provides some cushion to avoid damages, and permits thermal expansion. The invention is an electrode cap comprising a horseshoe-shaped conductor clip comprising an opening at a closed end for receiving an electrode, the conductor clip adapted to fit over a tube crimp; a substantially cylindrical base cap comprising an elongated bump at one end of the base cap parallel to the axis of the base cap; and a substantially cylindrical top cap closed on one end, having an inside diameter larger than the outside diameter of the base cap; and a spring means for pressing a plate against the base cap. These and other features, aspects, and advantages of the present invention will become better understood with regard to the following description, claims, and accompanying drawings.

DRAWINGS

TABLE OF REFERENCES

| | |
|---|---|
| 100 | Electrode Cap Assembly |
| 102 | Top Cap |
| 104 | Base Cap |
| 106 | Cap Spring |
| 108 | Conductor Clip |
| 110 | Wave Spring |
| 112 | Plate |
| 114 | Tube |
| 116 | Electrode |
| 118 | Crimp |
| 120 | Flap |
| 122 | Window |
| 124 | Bump |

DESCRIPTION

The invention is an electrode cap comprising a horseshoe-shaped conductor clip comprising an opening at a closed end for receiving an electrode, the conductor clip adapted to fit over a tube crimp; a substantially cylindrical base cap comprising an elongated bump at one end of the base cap parallel to the axis of the base cap; and a substantially cylindrical top cap closed on one end, having an inside diameter larger than the outside diameter of the base cap; and a spring means for pressing a plate against the base cap.

Figure 1:
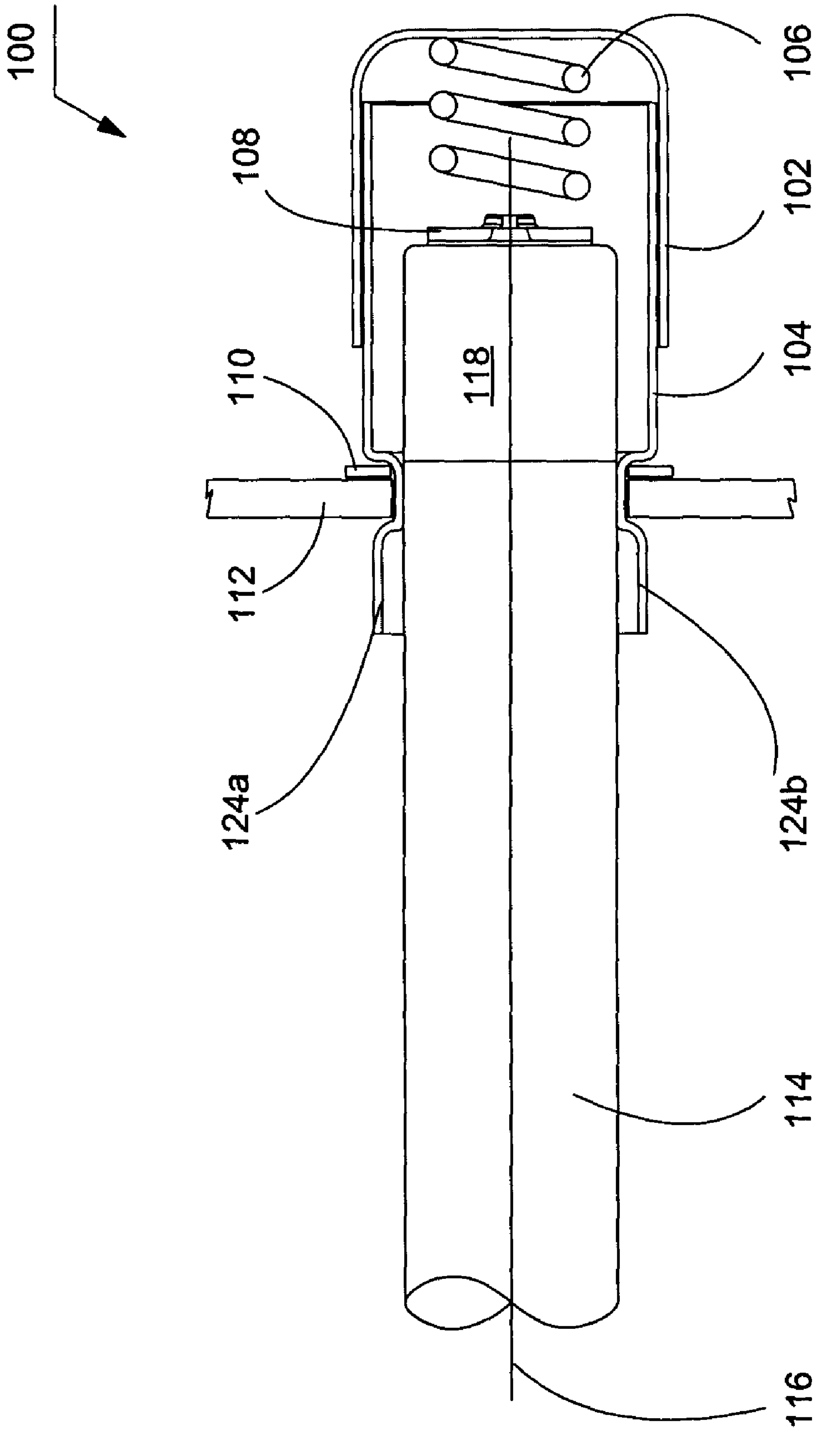
FIG. 1 is a cutaway view of an electrode cap of the present invention attached to a plate.

Turning to FIG. 1 an electrode tube is provided comprising a tube 114 and an electrode 116 disposed within the tube 114. The tube 114 is usually hollow, and can be filled with a gas to form a gas filled electrode ("GFE"). One end of the tube has a crimp 118 that is capable of containing gas within the tube 114, while the electrode 116 extends beyond the crimp.

An electrode cap assembly 100 is provided, that is made up of several parts. The parts are preferably made of an electrically conductive material, like stainless steel. First, a conductor clip 108 is secured to the crimp 118. The conductor clip is horseshoe shaped in cross section. The closed end of the conductor clip 108 has an opening for receiving the electrode. The conductor clip 108 is sized to fit over the crimp 118.

A base cap 104 is provided. It is substantially cylindrical in that it has two sections of different diameters. The smaller diameter is sized to just slide over the outside diameter of the tube 114. The smaller diameter also has one or more elongated bumps 124*a*, 124*b* parallel to the axis of the base cap 104. These bumps are for locking the electrode assembly 100 into a plate 112.

A substantially cylindrical top cap 102 is also provided. The top cap is closed on one end and open on the other. The inside diameter of the top cap 102 is sized to have a sliding fit with the outside diameter of the base cap 104 to provide an electrical connection and inhibit contamination. Preferably, the junction of the top cap 102 cylinder and closed end is rounded, as is shown in FIG. 1. The rounded quality inhibits for the formation of corona.

A helical compression cap spring 106 can be provided that has an outside diameter smaller than the inside diameter of the base cap 104. The cap spring 106 provides electrical connection and compression between the conductor clip 108 and top cap 102. One can also use a conical helical spring with the point of the cone contacting the conductor clip 108, or other types of springs that are known in the art.

A spring means 110 is placed over the base cap 104. The spring means 110 is preferably a wave spring, such as those conforming to DIN 137, although other springs could be used. Other spring means could be used, such as a helical spring, conical washer, or Belleville washer.

The spring means 110 keeps the electrode assembly 100 secure in the plate 112 after being inserted and twisted to lock it in place. A typical plate that would be used in this application is 12 gauge stainless steel. In FIG. 1, a wave spring is shown compressed flat.

Figure 2:
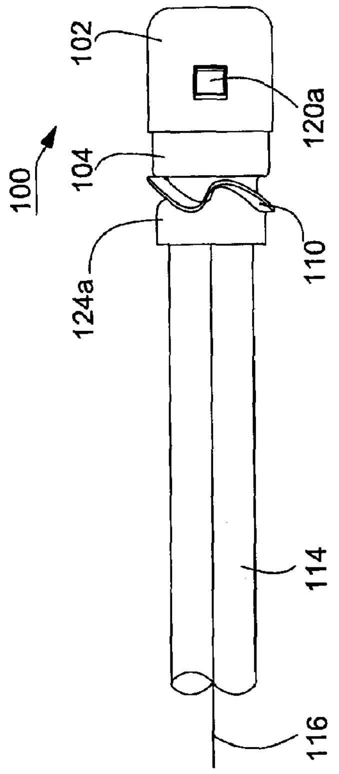
FIG. 2 is a plan view of the electrode cap without the plate.

FIG. 2 is a plan view of the electrode assembly 100 without the plate. The spring means 110 is shown as an uncompressed wave spring. This view also shows a flap 120 of the base cap 104 that has been received and secured by a window in the top cap 102.

Figure 3:
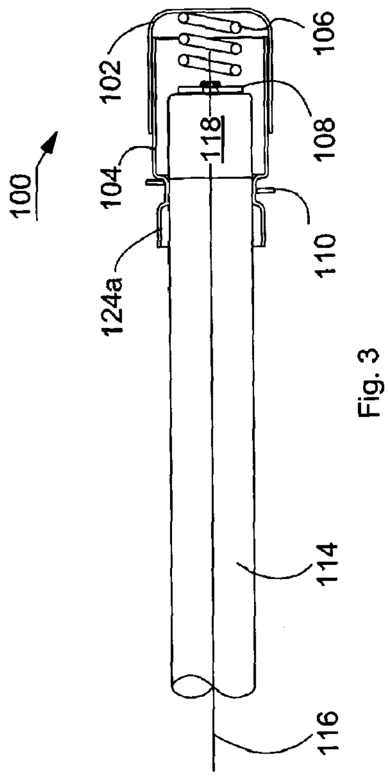
FIG. 3 is a cutaway plan view.

FIG. 3 is a cutaway view of the plan view of FIG. 2.

Figure 4:
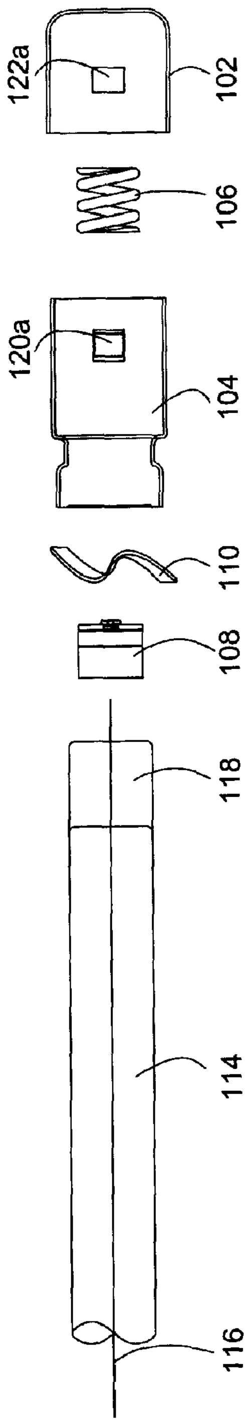
FIG. 4 is an exploded plan view.

FIG. 4 is an exploded view of the plan view. The flap 120 of the base cap 104 can be a rectangular section punched out of the base cap, and extending outward toward the bump. The window 122 of the top cap 102 is sized to receive and secure the base cap flap 120.

Figure 5:
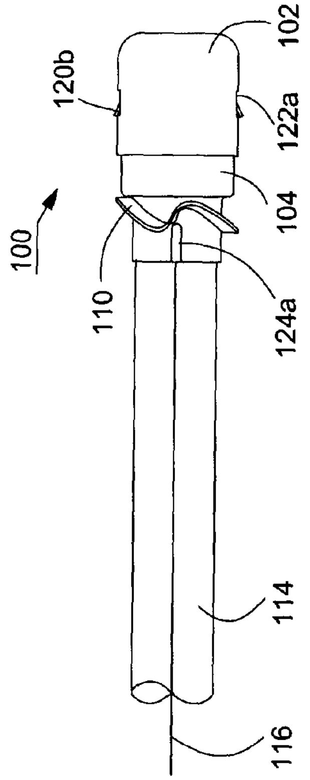
FIG. 5 is a side elevation of the electrode cap without the plate.

FIG. 5 is a side elevation of the electrode cap of the present invention. In this view the configuration of the elongated bump 124*a* is shown. The bump is on the end of the base cap 104 with the smaller diameter, and is parallel to the axis of the base cap. More than one bump can be provided.

In this view, details of the base cap flap 120*b* and window 122*a* are shown. Since the flap extends through the top cap 102, the top cap is locked while under compression. The top cap can be released by compressing the top cap and pressing in the flap so that it clears the window. Other mechanisms that are known in the art can be used to secure the top cap 102.

Figure 6:
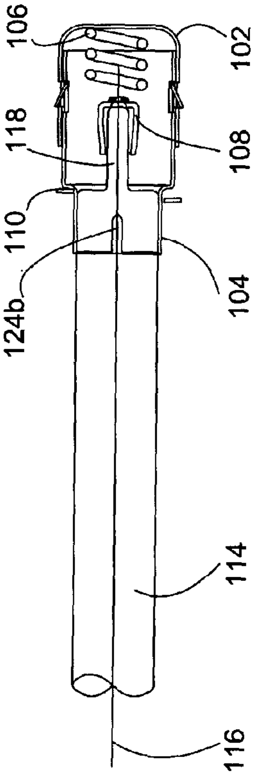
FIG. 6 is a cutaway side elevation.

FIG. 6 is the cutaway view of FIG. 5, and exposes an elongated bump 124*b* placed opposite that shown in FIG. 5. It is clear to see how the conductor clip 108 fits over the crimp 118.

Figure 7:
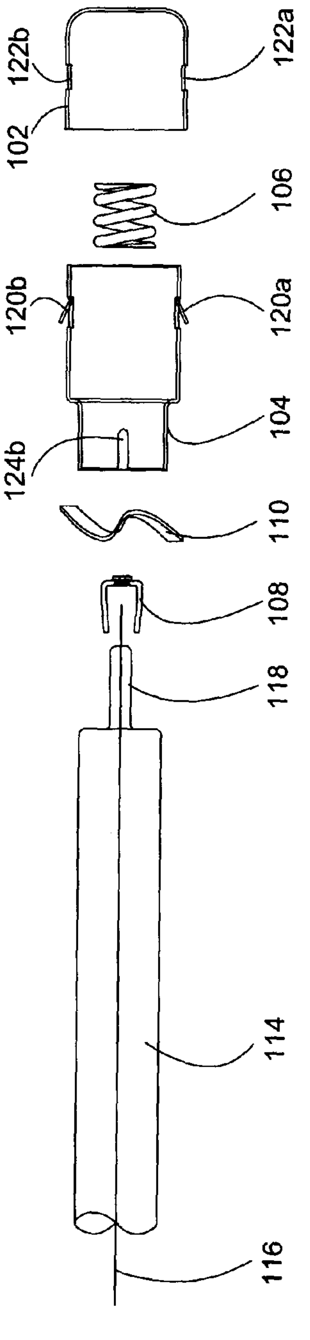
FIG. 7 is an exploded side elevation.

FIG. 7 is an exploded view of the side elevation. Details of two base cap flaps 120*a*, 120*b* and the top cap windows 122*a*, 122*b* are shown in this view.

In operation, the electrode assembly is installed by placing a horseshoe-shaped conductor clip 108 over the crimp 118; securing the electrode 116 to the conductor clip 108; placing a substantially cylindrical base cap 104 over the tube 114 at the crimp end, the base cap 104 having an elongated bump 124 at one end of the base cap 104 parallel to the axis of the base cap, and having an external flap 120 extending toward the bump 124. Then one places a helical compression cap spring 106 inside the base cap 104 and in contact with the conductor clip 108. Next, one assembles the top cap 102 so that the base cap flap 120 engages the top cap window 122 and locks. The next step is assembling a spring means 110 over the base cap 104. Assembling to a plate 112 is completed by inserting the electrode assembly 100 into the plate 112 having a hole to receive the base cap 104 and a groove to receive the bump 124 and twisting the electrode assembly to lock it in place.

Although the preferred embodiments of the present invention have been described herein, the above description is merely illustrative. Further modification of the invention herein disclosed will occur to those skilled in the respective arts and all such modifications are deemed to be within the scope of the invention as defined by the appended claims.

What is claimed is:

1. An electrode cap for removably securing an electrode to a plate comprising:
- a tube comprising a tube crimp at one end;
- a horseshoe-shaped conductor clip comprising an opening at a closed end for receiving an electrode, the conductor clip adapted to fit over a tube crimp;
- a substantially cylindrical base cap comprising an elongated bump at one end of the base cap parallel to the axis of the base cap;
- a substantially cylindrical top cap closed on one end, having an inside diameter larger than the outside diameter of the base cap;
- a spring means for pressing a plate against the base cap; and
- an electrode disposed within the tube and crimp adapted to be coupled with the conductor clip.

2. The electrode cap of claim 1, the base cap further comprising an external flap extending toward the elongated bump.

3. The electrode cap of claim 2, the top cap further comprising a window sized to receive and retain the external flap and to provide an electrical connection when assembled.

4. The electrode cap of claim 1, wherein the spring means is a wave spring.

5. The electrode cap of claim 1, wherein the conductor clip, base cap, top cap, and spring means are made from an electrically conductive material.

6. The electrode cap of claim 1, further comprising a helical compression cap spring having an outside diameter smaller than the top cap inside diameter for providing compression and electrical connection between the top cap and the conductor clip when assembled.

7. The electrode cap of claim 6, further comprising an electrically conductive plate for removably securing the electrode and providing electricity.

8. The electrode cap of claim 6, wherein the substantially cylindrical top cap comprises a substantially cylindrical portion, a closed end portion and a junction between the substantially cylindrical portion and the closed end portion, wherein the junction is rounded so as to prevent the formation of corona in operation.

9. A method of removably securing an electrode in a place comprising the steps of:
- providing an electrode tube comprising a tube, a crimp at one end of the tube, and an electrode disposed within the tube and crimp;
- placing a horseshoe-shaped conductor clip over the crimp;
- securing the electrode to the conductor clip;
- placing a substantially cylindrical base cap over the tube at the crimp end, the base cap having an elongated bump at one end of the base cap parallel to the axis of the base cap, and having an external flap extending toward the bump;
- placing a helical compression cap spring inside the base cap and in contact with the conductor clip;
- assembling a substantially cylindrical top cap that is closed on one end, having an inside diameter larger than the outside diameter of the base cap and having a window sized to receive and retain the base cap flap, so that the base cap flap engages the window and locks;
- assembling a wave spring over the base cap;
- inserting the electrode assembly into a plate having a hole to receive the base cap and a groove to receive the bump; and
- twisting the electrode assembly to lock it in place.

* * * * *